Aug. 27, 1940.   C. M. O'LEARY   2,212,747
COMBINED EXPANSION JOINT AND UNION
Filed Feb. 23, 1938
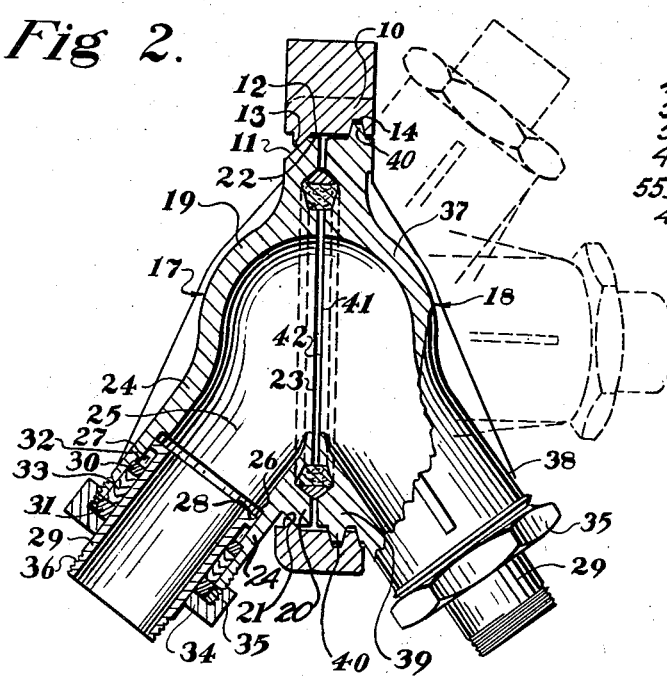
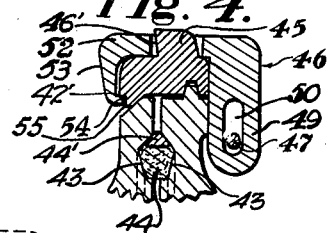
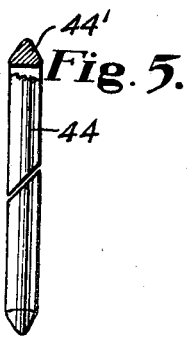
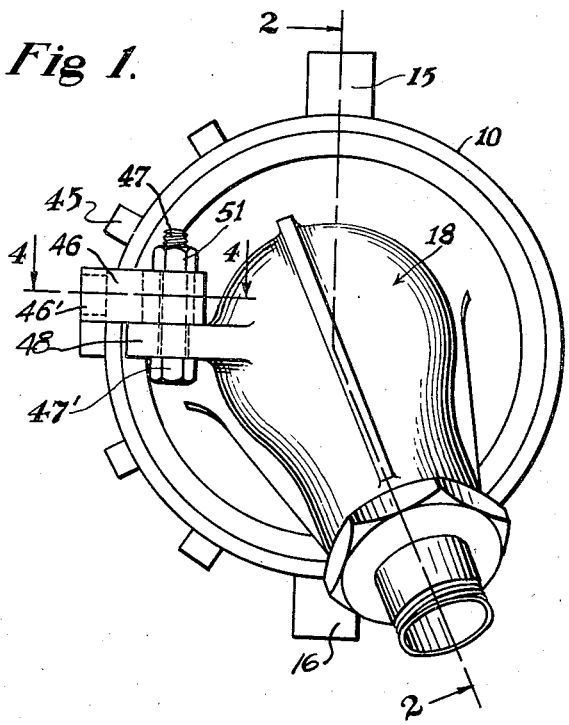
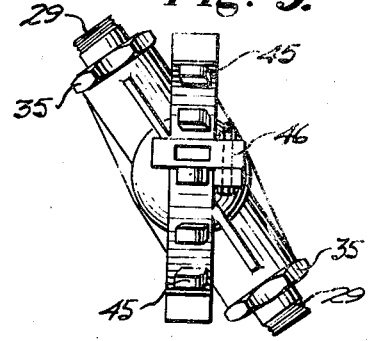
INVENTOR.
CHARLES M. O'LEARY
BY James M. Abbott
ATTORNEYS.

Patented Aug. 27, 1940

2,212,747

UNITED STATES PATENT OFFICE 2,212,747

COMBINED EXPANSION JOINT AND UNION

Charles M. O'Leary, Los Angeles, Calif.

Application February 23, 1938, Serial No. 191,874

3 Claims. (Cl. 285—121)

This invention relates to a pipe fitting and particularly pertains to a combined expansion joint and union.

In connection with the use of various liquid and fuel conduits, and particularly in connection with oil field pipe lines, it is desirable to provide a union for making connections between pipes which are disposed at various degrees of angularity to each other, and it is also desirable to provide a union structure which is fitted with means whereby longitudinal expansion and contraction of the pipes may be accommodated without breaking the joints or placing undue strain upon them. It is the principal object of the present invention to provide an expansion joint and union for pipes and the like which is simple in its construction, may be instantly assembled to connect the ends of two pipes which may be disposed at varying angles to each other and out of central longitudinal alignment.

The present invention contemplates the provision of two complementary pipe connection fittings, an expansion joint for one or both of said fittings and a union ring adapted to secure said two fittings in any desired angular position with relation to a common intermediate plane.

The invention is illustrated by way of example in the accompanying drawing, in which:

Figure 1 is a view in side elevation showing the present invention, and particularly disclosing the relationship of the locking element.

Fig. 2 is a view in transverse section through the union as seen on the line 2—2 of Fig. 1.

Fig. 3 is a view in plan showing the assembled structure.

Fig. 4 is an enlarged view in transverse section as seen on line 4—4 of Fig. 1 disclosing the lock device.

Fig. 5 is a view in section and elevation showing the metal gasket ring.

Referring more particularly to the drawing, 10 indicates a union coupling which is in the form of a ring member having a central circular opening 11 therethrough. The ring member is substantially rectangular in cross section. A cylindrical wall 12 provides a continuation of the opening 11. An annular lip 13 is formed on the leftward side of the wall 12. Thread grooves 14 are formed interiorly of the ring 10. The ring is preferably cast from material having suitable strength, but which is relatively light in weight. The thread groove 14 is cast with the ring and extends on a pitch line which makes it possible for members to be quickly assembled therewith. In fact, the thread groove is so formed that its circumferential length represents one turn and a short length of another turn so that the ends of the groove threads overlap so as to permit a companion threaded element to easily mesh therewith. Extending from diametrically opposite sides of the ring and radially thereto are lugs 15 and 16 which allow the ring to be easily held or rotated. Assembled with the ring are universal fittings 17 and 18. The fitting 17 has a hemispherical portion 19 formed with an annular lip 20, the circumference of which is such as to freely fit with relation to the wall 12 of the bore 11. An outer tapered face 21 is formed on the back of the lip 20 and rests against a similar tapered face 22 formed on the lip 13 of the ring 10. The walls of the hemispherical member are slightly off-set outwardly from end face 23 for a purpose to be hereinafter described. Formed integral with the hemispherical member of the fitting 17 is a tubular extension 24 which provides a passageway 25 communicating with the interior of the hemispherical member 19. A limiting shoulder 26 is formed within this passageway so as to form a bottom of a counterbore 27 and accommodates the flanged lip 28 of an expansion joint sleeve 29. A stop ring 30 is disposed around the sleeve and fits within a counterbore 31 of the passageway 25 and rests against a shoulder 32. Suitable non-metallic packing 33 encircles the sleeve 29 and rests against the ring 30. A packing gland 34 extends into the space between the sleeve 29 and the wall of the counterbore 31 to exert pressure against the packing. An outer threaded portion 35 of the packing gland engages threads on the exterior of the tubular member 24. This insures that a tight joint will be formed between the sleeve 29 and the member while permitting longitudinal movement of the sleeve with relation to the tubular portion 24. The outer end is suitably fitted such as for example by threads 36 to receive other tubular elements which might be connected with it. The universal fitting 18 has a hemispherical portion 37 which is complementary to the hemispherical portion 19 of the fitting 17. The universal fitting 18 is provided with a tubular extension 38 corresponding to the tubular extension 24 of the universal fitting 17. The tubular extension 38 is provided with a sleeve 29 and the other element previously described as forming an expansion joint, thus it will be seen that both of the universal fittings are provided with tubular extensions for connection with pipes, and that they also have expansion joints. It is also to be understood that the tubular members 24 and 38 may be disposed at other angles to the central axis of the ring 10 such for example as indicated in dotted lines in Fig. 2.

The universal fitting 18 is formed with a flange portion 39 around the circumference of which a thread 40 is cast, which thread agrees in shape and pitch with the thread groove 14 which is formed on the ring 10. It is desirable that the thread 40 be slightly narrower than the thread opening 14 so that there will be a loose fit between the thread groove and thread 40 making it possible for them to be easily placed in mesh and for the parts to be readily assembled and drawn into alignment. The radius of the hemispherical portion 37 is the same as that of the hemispherical portion 19. The end face 41 of the hemispherical portion 37 is, however, off-set from the center plane of the hemispherical structure so that a space 42 will occur between the faces 23 and 41 of the two universal fittings 17 and 18.

The faces 23 and 41 of fittings 17 and 18 will lie parallel to each other in spaced relation and are formed with complementary annular V-shaped grooves 43 between which a packing member including an annular non-metallic packing gasket 44 and a metallic split packing ring 44' is placed. This packing element is substantially of pyramidal shape in transverse section so that it will fit within the grooves 43 and will be wedged into position as the fittings are drawn together to provide a packing which will be compressed when the union ring 10 is tightened by rotation to bring the thread groove 14 and thread 40 into locking mesh. The packing element 44 as shown in the drawing is arranged with the metallic member 44' outermost so that it will be compressed, although it is to be understood that the arrangement may be reversed to dispose the metallic member 44' innermost so that it will be expanded when performing a packing action. By reference to the drawing it will be seen that the base width of the member 44' is normally less than the distance across the composite space formed by grooves 43 and the edges of the base face of member 44' are rounded. The base face of the non-metallic packing gasket 44 is wider however and fills the space across the grooves 43. This will act to force the metallic ring 44' against the non-metallic member 44 in a manner to cause the gasket to project into the space 42. This will increase the sealing function of the ring. It will also be recognized that the internal fluid pressure will act to force the gasket outwardly and increase the binding action. At such times member 44' will also act as an obstruction to prevent the packing gasket from extending outwardly between the faces 23 and 41. The grooves 43 may have a greater length along their inner faces, thus providing an increased space for accommodating the larger packing gasket.

Due to the fact that there are irregularities in castings and their threads, and that warping may occur I have provided an adjustable latch means which will allow for a wide variation of wear and warping, and which will allow for machining of the two faces when re-facing is necessary and will still be capable of holding and locking the elements in a fluid tight relation. This adjustment also provides for any wear of the threads, and is extremely desirable in the present construction due to the fact that the threads used are fast operating threads which of necessity have a steep pitch and might tend to rotate to disengaged positions if they were not provided with a positive lock.

Formed at intervals around circumferential edge of the ring 10 and extending radially therefrom are locking lugs 45. Mounted to swing between these lugs is the latch member 46 which is carried by a boss 48 formed integral with the universal fitting 18. The latch member 46 has a main arm portion 49 formed with a slot 50 to accommodate a bolt 47. Bolt 47 is provided with a head 47' and a nut 51. The portion continues in an overhanging length 52 which extends transversely of the outer face of the ring 10 and continues in a radial extending portion 53 which may be brought over and around the ring. The radial portion 53 terminates in a hooked end 54 which extends into a shoulder 55 of ring 10, thus it will be seen that when the latch member 46 swings over to the position disclosed in Fig. 4 of the drawing it will serve to lock the ring 11 and the universal fitting 18 against relative rotation.

In the event that the latch member 46 cannot register with the space between the lugs 45, the nut 51 on bolt 47 may be adjusted to permit lateral movement of the latch so as to provide registration of the parts. This bolt and nut will then act when tightened to set and tighten the parts. The latch 46 is also formed with a slotted opening 46' to receive a lug 45 when in register therewith.

In operation of the present invention the structure is made as here shown and described, care having been taken to insure that the thread groove 14 and thread 40 will not mesh tightly, but that normally they will fit loosely so that the ring 10 may be easily tightened around them to produce a tightening and aligning action. The universal fitting 17 is first passed through the ring 10 and it may then be connected with a pipe through the medium of the sleeve 29. The ring gasket 44 is then placed in position within the grooves 43 of the universal fitting, and a similar groove of the fitting 18 may be brought to bear against the opposite side of the ring. The sleeve 29 of the fitting 18 may then be connected with a pipe when this assembly is made. In either event the ring 10 is moved toward a setting position with relation to the flange 20 of the universal fitting 17 and with its thread 40 moving into mesh with the thread groove 14 of the ring 10. The ring 10 may then be rotated to draw the two fittings toward each other and to force the grooves 43 and the faces 23 and 41 into a binding position against the opposite edges of the packing element including the ring gasket 44, and the ring 44'. When the parts have been properly tightened with relation to each other the latch member 46 may be swung to its latching position for example as shown in Fig. 4 and will prevent relative rotation of the ring 10 and the universal fitting 18.

It is to be understood that while the two tubular extensions 24 and 38 of the universal fittings 17 and 18 are here shown as lying with their center axes in a common place and at complementary angles to each other, that the fittings may be rotated so that the tubular portions 24 and 38 lie in different planes with relation to each other while swinging radially of a central axis passing through the center of the ring 10 and at right angles to the normal plane thereof. It will also be understood that while the tubular extensions 34 and 38 are shown as oppositely disposed at the same angles to the aforesaid central axis, that if desired these angles may be varied with relation to each other or may be made coincident with each other and the aforesaid central axis. This makes it possible to use this particular type of coupling for various purposes and applications.

It will thus be seen that the structure here disclosed provides a simple structure of light weight and great strength whereby two sections of pipe disposed at angular relation to each may be quickly connected, and will be supplied with expansion joints for accommodating longitudinal expansion and contraction of the parts without imposing an undue objectional strain upon them. It will also be seen that due to the thread formation care does not have to be taken to accurately align the parts, but that the parts may be quickly assembled and held in communication by the structure here shown.

While I have shown the preferred form of my invention as now known to me, it will be understood that various changes may be made in combination, construction, and arrangement of parts by those skilled in the art, without departing from the spirit of my invention as claimed.

Having thus described my invention, what I claim and desire to secure by Letters Patent is:

1. In a pipe union of the type described comprising a pair of universal fittings, each fitting including a substantially hemispherical shell and a tubular extension communicating therewith, said fittings having an outwardly extending annular flange embracing the equatorial portion of the shell, a ring encircling the flanges of said fittings, said ring having an annular inturned shoulder formed on substantially one edge of the inner wall thereof and adapted to engage the outer edge of the flange on one of said fittings, a thread formed on the remaining inner wall portion of the ring adapted to engage a complementary thread formed on the outer circumference of the flange of the other of said fittings whereby rotation of the ring will draw the equatorial portions of the two fittings together, said ring having a plurality of lugs formed on the outer circumference thereof, a latch means carried by one of the said fittings adapted to swing to a position overlapping the ring and engaging one of said lugs to hold the fittings and the ring in locked relation to one another, and additional means to hold the latch in locking relation with the lug.

2. In a pipe union of the type described comprising a pair of universal fittings, each fitting including a substantially hemispherical shell and a tubular extension communicating therewith, said fittings having an outwardly extending annular flange embracing the equatorial portion of the shell, a ring encircling the flanges of said fittings, said ring having an annular inturned shoulder formed on substantially one edge of the inner wall thereof and adapted to engage the outer edge of the flange of one of said fittings, a thread formed on the remaining inner wall portion of the ring adapted to engage a complementary thread formed on the outer circumference of the flange of the other of said fittings whereby rotation of the ring will draw the equatorial portions of the two fittings together, said ring having a plurality of lugs formed on the other circumference thereof, and latch means having a central slot therethrough adapted to encircle one of said lugs when said latch member is moved to a position embracing the ring, said means holding the fittings and the ring in interlocked relation.

3. In a pipe union of the type described comprising a pair of universal fittings, each fitting including substantially a hemispherical shell and a tubular extension communicating therewith, said fittings having an outwardly extending annular flange embracing the equatorial portion of the shell, a ring encircling the flanges of said fittings, said ring having an annular inturned shoulder formed on substantially one edge of the inner wall thereof and adapted to engage the outer edge of the flange of one of said fittings, a thread formed on the remaining inner wall portion of the ring adapted to engage a complementary thread formed on the outer circumference of the flange of the other of said fittings whereby rotation of the ring will draw the equatorial portions of two fittings together, said ring having a plurality of lugs formed on the outer circumference thereof, and latch means having a center slot therethrough adapted to encircle one of said lugs when said latch member is moved to a position embracing the ring, said means holding the fittings and the ring in interlocking relation, and additional means to hold the latch in its embracing position.

CHARLES M. O'LEARY.